(12) United States Patent
Zhang et al.

(10) Patent No.: US 7,603,203 B2
(45) Date of Patent: Oct. 13, 2009

(54) METHOD FOR VOLTAGE INSTABILITY LOAD SHEDDING USING LOCAL MEASUREMENTS

(75) Inventors: Pei Zhang, Campbell, CA (US); Liang Min, Santa Clara, CA (US); Nan Zhang, Santa Clara, CA (US)

(73) Assignee: Electric Power Research Institute, Inc., Charlotte, NC (US)

( * ) Notice: Subject to any disclaimer, the term of this patent is extended or adjusted under 35 U.S.C. 154(b) by 423 days.

(21) Appl. No.: 11/539,758

(22) Filed: Oct. 9, 2006

(65) Prior Publication Data

US 2008/0086239 A1 Apr. 10, 2008

(51) Int. Cl.
*G05D 5/00* (2006.01)
(52) U.S. Cl. .................. 700/295; 700/292; 700/294
(58) Field of Classification Search .......... 700/292–295
See application file for complete search history.

(56) References Cited

U.S. PATENT DOCUMENTS

| | | | |
|---|---|---|---|
| 4,661,769 A * | 4/1987 | Girgis ..................... | 324/76.74 |
| 5,745,368 A * | 4/1998 | Ejebe et al. ............... | 702/164 |
| 6,249,719 B1 * | 6/2001 | Vu et al. .................. | 700/292 |
| 6,496,757 B1 * | 12/2002 | Flueck et al. ............. | 700/292 |
| 6,754,597 B2 * | 6/2004 | Bertsch et al. ........... | 702/57 |
| 6,909,261 B2 * | 6/2005 | Laig-Horstebrock et al. ..... | 320/132 |

OTHER PUBLICATIONS

Vu et al. (Use of Local Measurements to Estimate Voltage-stability Margin, IEEE, 1997.*

Warland, A voltahe Instability Predictor Using Local Area Measurements VIP++, Norwegian University of Science and Technology, Feb. 12, 2002, pp. 1, 47-53, 55-58, and 75.*

Welch, an introduction to the kalman filtert, University of North Carolina, http://info.acm.org/pubs/toc/CRnotice.html, 2001.*

Alzahawi et al., A special Protection Scheme for Voltage Stability Prevention, Power System Research Group, 2005.*

Smieee et al., Different Types of Voltage Instability, IEEE/PES 1993 Summer Meeting, 1993. Bittanti et al., The Power Plant Voltage/Reactive Power Regulator with an Adaptive Control Solution, IEEE, 2003.*

Yabe et al., Conceptual Designs of AI-based Systems for Local Prediction of Voltage Collapse, IEEE, 1995.*

Soliman et al., Harmonic modeling of linear and nonlinear loads based on Kalman filtering algorithm, Electric Power Systems Research 72 (2004) 147-155.*

Soliman et al., Power system voltage stability margin identification using local measurements, IEEE, 2003.*

(Continued)

*Primary Examiner*—Albert DeCady
*Assistant Examiner*—Darrin Dunn
(74) *Attorney, Agent, or Firm*—Trego, Hines & Ladenheim, PLLC

(57) ABSTRACT

A method of voltage instability load shedding, that includes the steps of measuring current and voltage waveforms of an electrical system at a local bus estimating the Thevenin equivalent admittance based on Kalman Filter techniques, then a voltage stability margin index is calculated using the voltage magnitude. The determined Thevenin admittance and the load at the local system bus and the calculated voltage stability margin index is compared with a predetermined threshold value to determine whether to initiate a load shedding action.

5 Claims, 3 Drawing Sheets

OTHER PUBLICATIONS

Ohtsuka et al., An equivalent of multi-machine power systems and its identification for on-line application to decentralized stabilizers, IEEE, 1989.*

Feng et al., A comprehensive approach for preventive and corrective control to mitigate voltage collapse, IEEE, 2000.*

Balanathan et al., A strategy for undervoltage load shedding in power systems, IEEE, 1998.*

Taylor, C.W., Power System Voltage Stability, McGraw Hill, 1994.

Vu, K. et al., "Voltage Instability: Mechanisms and Control Strategies", Proc. Of IEEE, Nov. 1995, 83(11), 1442-1455.

Vu, K. et al., "Grids Get Smart Protection and Control Strategies", IEE Comp. Appl. Power, 1997, 40-44.

Tuan, T. et al., "Emergency Load Shedding to Avoid Risks of Voltage Instability Using Indicators", IEEE Trans, PWRS, Feb. 1994, 9(1), 341-351.

Vu, K. et al., "Use of Local Measurement to Estimate Voltage—Stability Margin", IEEE, 1997, 318-323.

Yabe, K. et al., "Conceptual Designs of AI-based Systems for Local Predicition of Voltage Collapse", IEEE PWRS< Feb. 1996, 11(1), 181-188.

IEEE Power System Relaying Committee, Working Group K12, "Voltage Collapse Mitigation", 1995.

Vu, K. et al., "Use of Local Mesurement to Estimate Voltage-Stability Margin", Jan. 1997.

* cited by examiner

METHOD FOR VOLTAGE INSTABILITY LOAD SHEDDING USING LOCAL MEASUREMENTS

TECHNICAL FIELD AND BACKGROUND OF THE INVENTION

This invention relates to a method of determining voltage stability margin at local bus level and to applying the method to enhance under-voltage load shedding protection scheme. We named this new protection scheme as "voltage instability load shedding".

Under Voltage Load Shedding (UVLS) has been used as an economic means of avoiding voltage collapse. Since load shedding results in high costs to electricity suppliers and consumers, this option is only used when all other means of avoiding voltage collapse are exhausted. UVLS sheds load in pre-defined blocks that are triggered in stages when local voltage drops to the pre-defined levels.

In most UVLS schemes, voltage magnitude is the only triggering criterion. However, past research has demonstrated that voltage magnitude alone is not a satisfactory indicator of the proximity to voltage instability under all circumstances. In fact, voltage stability is determined by the ability of the power system to supply and deliver reactive power. In actual systems, the computation of actual system PV curves may be very complicated due to the large number of generators, widespread applications of capacitor banks, uncertainty about the dynamic characteristics of system loads, and the variability of power flow pattern. In addition, operation of under load tap changers, the actual dynamic reactive capability of generators and accurate reactive reserve all affect the ability of the system to supply and deliver the reactive power. Therefore, determination of proper settings for UVLS schemes becomes a challenging task for system planners.

Moreover, modeling uncertainties post more challenges for system planners to determine the proper settings for UVLS schemes. Current settings of UVLS are determined by system planning engineers through extensive network analyses using computer simulation packages. However, simulated system behaviors do not usually coincide with actual measured system responses due to data and modeling issues. Inappropriate settings can result in unnecessary shedding or failure to detect the need for load shedding.

SUMMARY OF THE INVENTION

A new control method referred to as "Voltage Instability Load Shedding" (VILS) is disclosed in this application. This new control method can enhance the conventional UVLS at designated locations, such as major load centers. This smart control scheme computes Voltage Stability Margin Index (VSMI) continuously to track the voltage stability margin at local bus level. The VSMI is expressed as active, reactive, and apparent power. The VSMI is used as an adaptive triggering criterion for load shedding.

This VILS method comprises the steps of, or means for, measuring current and voltage waveforms at the local load bus, therefrom estimating Thevenin equivalent admittance (Y), then calculating the VSMI, and finally comparing the VSMI with the pre-set threshold to decide whether to initiate a load shedding action.

Therefore, it is an object of the invention to provide a new load shedding strategy subject to voltage instability.

It is another object of the invention to provide a new method of estimating voltage stability margin at local bus level.

It is another object of the invention to express the voltage stability margin in terms of real, reactive and apparent power.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
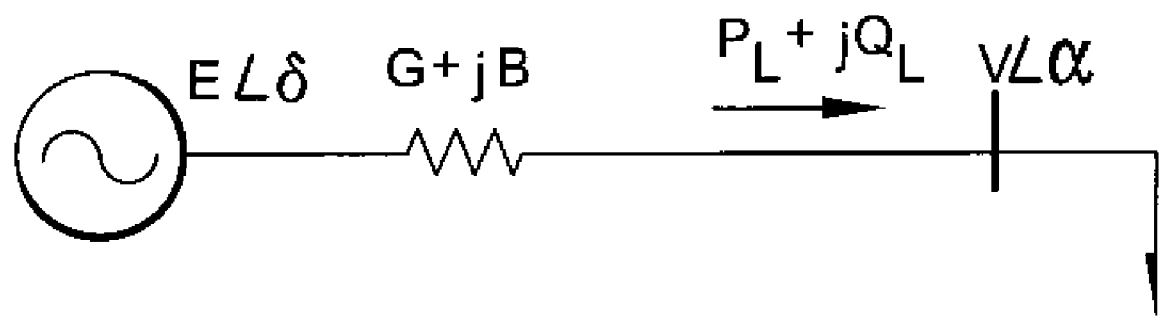
FIG. 1 depicts the Thevenin equivalent system.

Referring now to FIG. 1, the real and reactive power transferred from the system to the load is $$\begin{cases} P_L = EVY\cos(\alpha - \delta - \beta) - V^2 G \\ Q_L = EVY\sin(\alpha - \delta - \beta) + V^2 B \end{cases} \quad (1)$$

Where Y is the magnitude and $\beta$ is the angle of the Thevenin equivalent admittance $G+jB$ Dividing $E^2 Y$ on both sides of Equation (1), it can be reformulated as:

$$\begin{cases} p = v\cos(\alpha - \delta - \beta) - v^2\cos\beta \\ q = v\sin(\alpha - \delta - \beta) + v^2\sin\beta \end{cases} \quad (2)$$

where $$p = \frac{P_L}{E^2 Y}, \quad q = \frac{Q_L}{E^2 Y}, \quad v = \frac{V}{E}$$

Moving $v^2 \cos \beta$ and $v^2 \sin \beta$ to the left sides and taking the square of the right and left sides and adding, the following equation is obtained:

$$(p+v^2 \cos \beta)^2 + (q - v^2 \sin \beta)^2 = v^2 \quad (3)$$

Substitute q with p·tan $\phi$, where $\phi$ is the power factor of load.

From equation (3) is obtained:

$$p = -v^2 \cos \phi \cos(\phi+\beta) + \cos \phi \sqrt{v^2 - v^4 \sin^2(\phi+\beta)} \quad (4)$$

Taking the derivative and setting it equal to zero, the normalized critical voltage and maximum power is obtained:

$$\frac{\partial p}{\partial v} = 1 - 4v^2 + 4v^4 \sin^2(\phi + \beta) = 0 \quad (5)$$

$$v_{critical}^2 = \frac{1 - \cos(\phi + \beta)}{2\sin^2(\phi + \beta)} = \frac{1}{2[1 + \cos(\phi + \beta)]} \quad (6)$$

$$p_{max} = \frac{\cos\phi}{2[1 + \cos(\phi + \beta)]} \quad (7)$$

The maximum active and reactive transfer power is expressed as:

$$P_{max}=E^2Y \cdot p_{max}=V^2Y\cos\phi$$

$$Q_{max}=E^2Y \cdot Q_{max}=V^2Y\sin\phi \quad (8)$$

Figure 2:
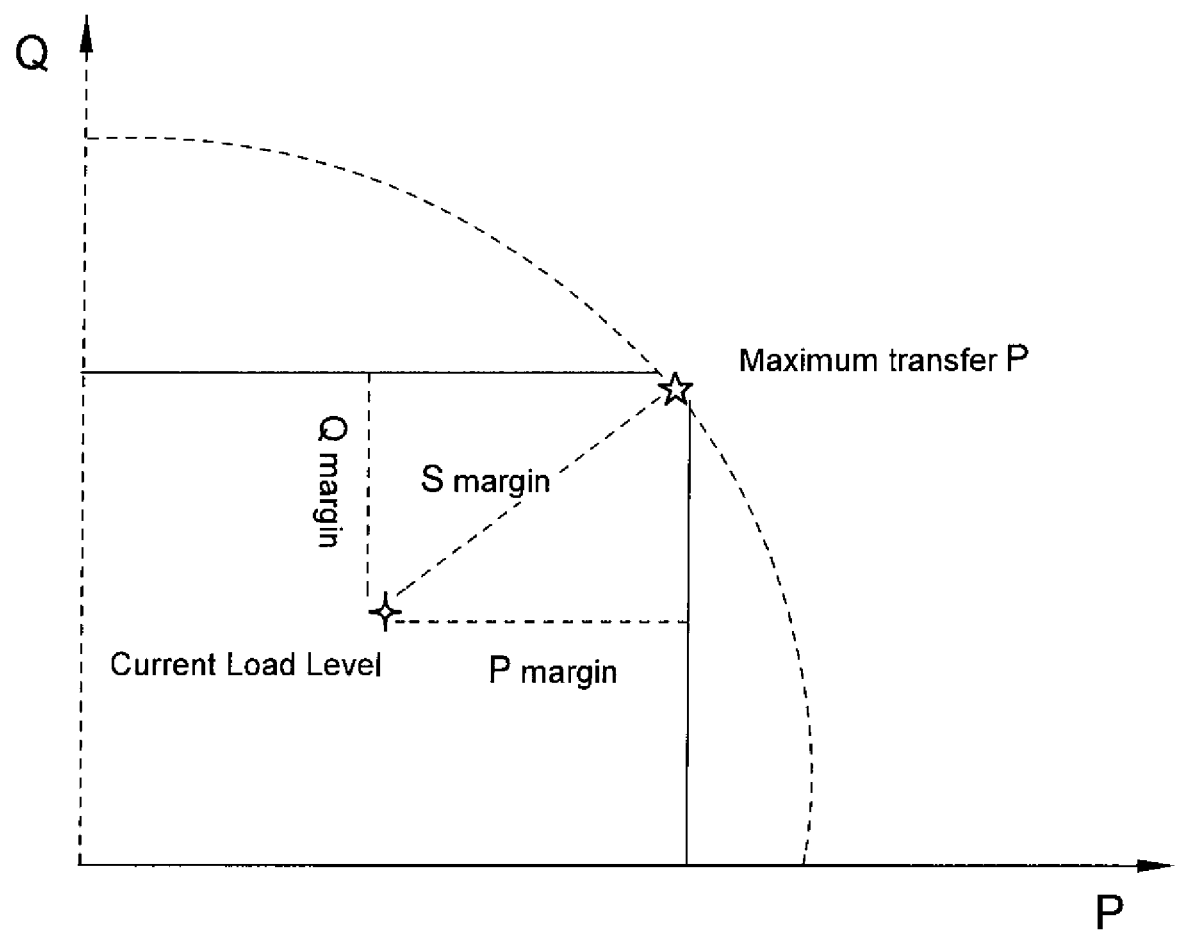
FIG. 2 depicts an exemplary graph where tracking closeness to voltage instability becomes tracking the distance of the current load level to maximum power transfer in terms of voltage stability limit.

Therefore, as is shown in FIG. 2, tracking closeness to voltage instability becomes tracking the distance of the current load level to maximum power transfer. The VSMI expressed by equation (9-11) provides voltage stability margin in terms of the apparent, active and reactive power.

Voltage stability margin in terms of active power:

$$P_{Margin}=P_{max}-P_L \quad (9)$$

Voltage stability margin in terms of reactive power $$Q_{Margin}=Q_{max}-Q_L \quad (10)$$

Voltage stability margin in terms of apparent power $$S_{Margin}=\sqrt{P_{max}^2+Q_{max}^2}-S_L \quad (11)$$

The closer the VSMI are to zero, the more imminent is the system to voltage instability. VSMI also indicates how much load needs to be shed in order to prevent voltage instability.

In Equations (9-11), $P_L$ and $Q_L$ can be calculated using the local measurements of voltage and current samples, while the Thevenin Equivalent admittance Y in (8) must be estimated. An estimation method using Kalman Filter is therefore developed.

The estimation equation is:

$$\hat{z}=H\hat{x}+\hat{v} \quad (12)$$

where $\hat{z}$ is the measurement vector. $\hat{x}$ is the state vector to be estimated, H is the observation model, and $\hat{v}$ is the observation noise.

To minimize the estimation error, we are trying to minimize a cost function that $$J = \frac{1}{2}(\hat{z}-H\hat{x})^T(\hat{z}-H\hat{x}) \quad (13)$$

The criterion to minimize the J is that its derivative equals to zero $$\frac{\partial J}{\partial \hat{x}} = -(\hat{z}-H\hat{x})^T H = 0 \quad (14)$$

At that time the estimation of $\hat{x}$ is given as $$\hat{x}_{est}=(H^TH)^{-1}H^T\hat{z} \quad (15)$$

Now deriving a recursive equation to estimate the $\hat{x}$. Let P is the covariance of the error in the estimator as:

$$P = E[\tilde{x}_{est}\tilde{x}_{est}^T] \quad (16)$$
$$= (H^TH)^{-1}H^TRH(H^TH)^{-1}$$
$$= (H^TR^{-1}H)^{-1}$$

where $\tilde{x}=x-\hat{x}_{est}$, and R is the covariance matrix of measurement error.

Represent equation (17) using the discrete measured values $$P_n = \left(\sum_{i=1}^{n} H_i^T R_i^{-1} H_i\right)^{-1} \quad (17)$$
$$= \left(\sum_{i=1}^{n-1} H_i^T R_i^{-1} H_i + H_n^T R_n^{-1} H_n\right)^{-1}$$
$$= (P_{n-1}^{-1} + H_n^T R_n^{-1} H_n)^{-1}$$

Equation (15) at time instant n is written as:

$$\hat{x}_n = \left(\sum_{i=1}^{n} H_i^T R_i^{-1} H_i\right)^{-1}\left(\sum_{i=1}^{n} H_i^T R_i^{-1} z_i\right) \quad (18)$$
$$= P_n\left[\sum_{i=1}^{n-1} H_i^T R_i^{-1} z_i + H_n^T R_n^{-1} z_n\right]$$
$$= P_n(P_{n-1}^{-1}\hat{x}_{n-1} + H_n^T R_n^{-1} z_n)$$

Define $$K_n = P_n H_n^T R_n^{-1} \quad (19)$$

Then equation (18) would be $$\hat{x}_n=P_nP_{n-1}^{-1}\hat{x}_{n-1}+K_n\hat{z}_n \quad (20)$$

Since $$P_nP_{n-1}^{-1}=I-K_nH_n \quad (21)$$

Then, the recursive equation to estimate $\hat{x}_n$ is $$\hat{x}_n=\hat{x}_{n-1}+K_n[z_n-H_n\hat{x}_{n-1}] \quad (22)$$

Now apply the above method in the load shedding problem. From FIG. 1

$$E-jY^{-1}I=V \quad (23)$$

where
E is the Thevenin equivalent generator terminal voltage; V is the local load bus voltage;
I is the line current; and Y is the Thevenin equivalent admittance.
V and I can be measured at local bus.

Denote $E=E_r+jE_i$, $V=m+jn$, $I=p+jq$, $Z=1/Y=R+jX$.

Then, in accordance with equation (12):

$$\hat{z} = \begin{bmatrix} m \\ n \end{bmatrix} \quad (24)$$

$$H = \begin{bmatrix} 1 & 0 & -p & q \\ 0 & 1 & -q & -p \end{bmatrix} \quad (25)$$

$$\hat{x} = \begin{bmatrix} E_r \\ E_i \\ R \\ X \end{bmatrix} \quad (26)$$

When applying the recursive equation (22), several parameters need to be initialized. According to the preferred embodiment:

(i) the initial value of $\hat{x}$ is set based on the power flow solution;

(ii) the covariance matrix of measurement error R, is set according to the standard deviation of the measurement device, which reflects the expected accuracy of the corresponding meter used;

(iii) P is the covariance matrix of the estimator error. The initial value of P is set as a diagonal matrix with the element value equal to 0.000001.

The estimation method uses a sliding data window with four samples per window. The estimation of the Thevenin admittance is conducted continuously. Preferably, the sampling time step is set as 0.01 s or 1 cycle based on 60 Hz. This sampling rate is determined based on the considerations of obtaining accurate estimation value of the Thevenin admittance and having enough time to detect a fault in order to block the load shedding function during the fault.

Figure 3:
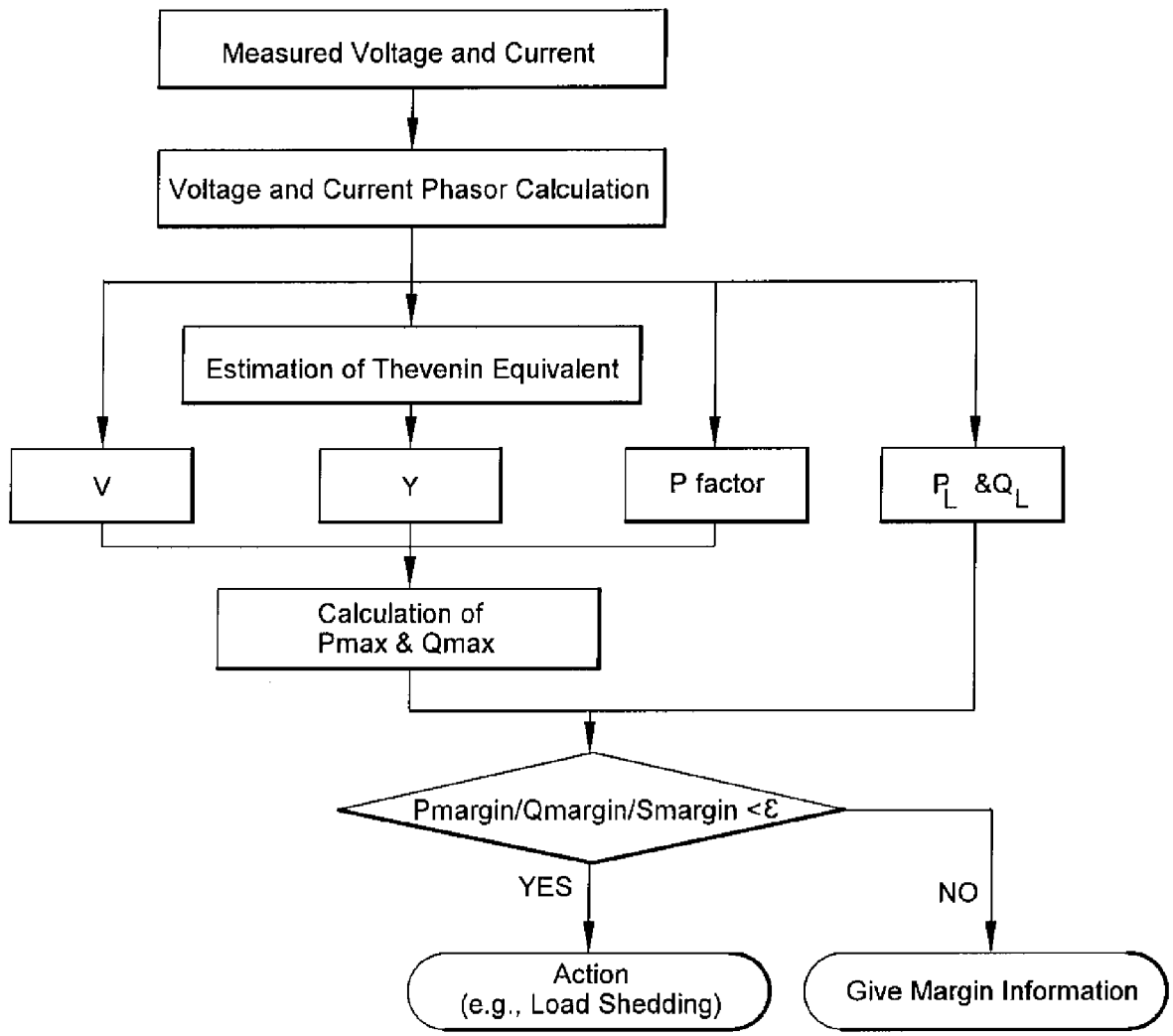
FIG. 3 depicts a flowchart of the operation of a VILS system.

Referring now to the flowchart shown in FIG. 3, the proposed VILS method is summarized. In FIG. 3, $\epsilon \geq 0$ represents a mismatch margin that is set by the user.

The voltage and current samples are measured directly at local bus. With those samples, the active power of local load ($P_L$) and reactive power of local load ($Q_L$) can be calculated and the Thevenin admittance Y can be estimated using the Kalman Filter estimation method described earlier. Then, voltage stability margin in terms of active power, reactive power and apparent power is calculated using (9~11). This margin, then, compared with the user set mismatch margin, $\epsilon$ to determine whether load shedding should be taken.

The voltage instability load shedding method is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A method of voltage instability load shedding, comprising the steps of:
   (a) measuring current and voltage waveforms of an electrical system at a local system bus;
   (b) estimating a Thevenin equivalent admittance (Y) based on Kalman filter techniques using z=Hx+v where z is a measurement vector, x is a state vector to be estimated, H is an observation model, v is an observation noise, wherein an initial value x is set based on a power flow solution, a covariance matrix of measurement error R set according to an accuracy of a measurement device, and an initial value of a covariance of an estimation error P set as a diagonal matrix with an element value equal to 0.000001;
   (c) calculating a voltage stability margin index using a magnitude of the voltage waveform, a determined Thevenin admittance, and a load at the local system bus;
   (d) comparing the calculated voltage stability margin index with a predetermined threshold value; and
   (e) utilizing the comparison between the calculated voltage stability margin index with the predetermined threshold value to determine whether to initiate a load shedding action.

2. A method of voltage instability load shedding according to claim 1, wherein the estimation of the Thevenin admittance is conducted continuously and a Kalman filter estimation method uses a sliding data window with four samples per window.

3. A method of voltage instability load shedding according to claim 1, wherein a sampling time step is set as 1 cycle, based on 60 Hz.

4. A method of voltage instability load shedding according to claim 1, wherein a sampling rate is determined based on the estimation value of the Thevenin admittance with sufficient time to detect a fault in order to block a load shedding function during a fault.

5. A method of voltage instability load shedding according to claim 1, wherein the voltage stability margin is expressed in terms of an apparent, active, and reactive power.

* * * * *